United States Patent [19]

Barry

[11] Patent Number: 4,881,890
[45] Date of Patent: Nov. 21, 1989

[54] MOULDED RESIN ARTICLE

[76] Inventor: Andrew S. Barry, P.O. Box 515, Hurstville, New South Wales, 2220, Australia

[21] Appl. No.: 212,970

[22] Filed: Jun. 29, 1988

Related U.S. Application Data

[63] Continuation of Ser. No. 937,556, Dec. 3, 1986.

[30] Foreign Application Priority Data

Jun. 12, 1985 [AU] Australia ............................. PH3762

[51] Int. Cl.⁴ .............................................. B29F 1/00
[52] U.S. Cl. .................................. 425/543; 264/328.6; 425/546
[58] Field of Search .................. 425/543, 546; 249/81, 249/107, 109, 110, 128, 129, 137, 141, 163, 166, 119, 130, 138; 264/347, 328.6; 366/336, 337, 340; 417/519; 92/201, 203, 207; 164/292, 296, 343, 350, 339, 437, 342, 322

[56] References Cited

U.S. PATENT DOCUMENTS

| | | | |
|---|---|---|---|
| 587,728 | 8/1897 | Griffith et al. ........................ | 249/126 |
| 1,415,617 | 5/1922 | Wepplo ................................ | 417/519 |
| 2,085,959 | 7/1937 | Donegan ............................... | 249/81 |
| 2,218,612 | 10/1940 | Lockwood ............................. | 249/141 |
| 2,434,063 | 1/1948 | Birchfield ............................. | 92/207 |
| 3,991,971 | 11/1976 | Drake .................................. | 249/141 |
| 4,081,225 | 3/1978 | Yaita ................................... | 249/141 |
| 4,088,449 | 5/1978 | Smith .................................. | 366/337 |
| 4,234,107 | 11/1980 | Gernlein ............................... | 417/519 |
| 4,431,384 | 2/1984 | Walser ................................. | 417/519 |
| 4,439,386 | 3/1984 | Antczak ............................... | 264/328.6 |
| 4,534,924 | 8/1985 | Kariakin .............................. | 249/129 |

OTHER PUBLICATIONS

"New RIM Metering System", Process Engineering, p. 15, Pub. Date Unknown.

Primary Examiner—Charles Hart
Attorney, Agent, or Firm—Pravel, Gambrell, Hewitt, Kimball & Krieger

[57] ABSTRACT

A moulding apparatus for moulding a reaction composition including a metering cylinder having an open head-end, a piston in said cylinder, screw operable for advancement towards and retraction from said head-end, a cylinder head on said head-end, an intake port and a discharge port both opening to said head-end and both extending through said head, a circularly sectioned valve chamber extending through said head and intersecting both said ports, a plug valve rotatably housed in said chamber and having two angularly phased-apart passages through it respectively able to register with said ports, and means for actuation of said piston and rotation of said plug-valve under such co-ordinated or independent control that when said piston is retracting from said head-end the intake port is open and the discharge port is closed, and when said piston is advancing towards said head-end the intake port is closed and the discharge port is open.

28 Claims, 7 Drawing Sheets

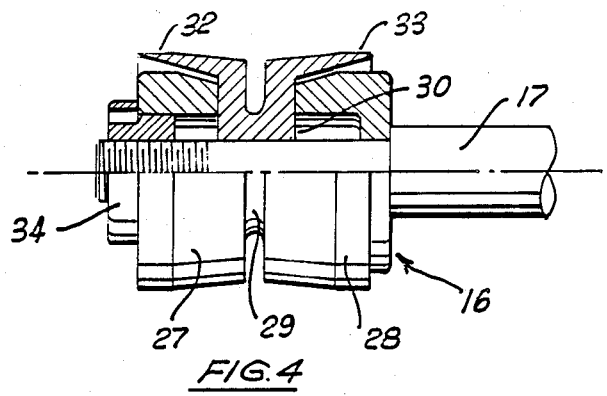
FIG. 4
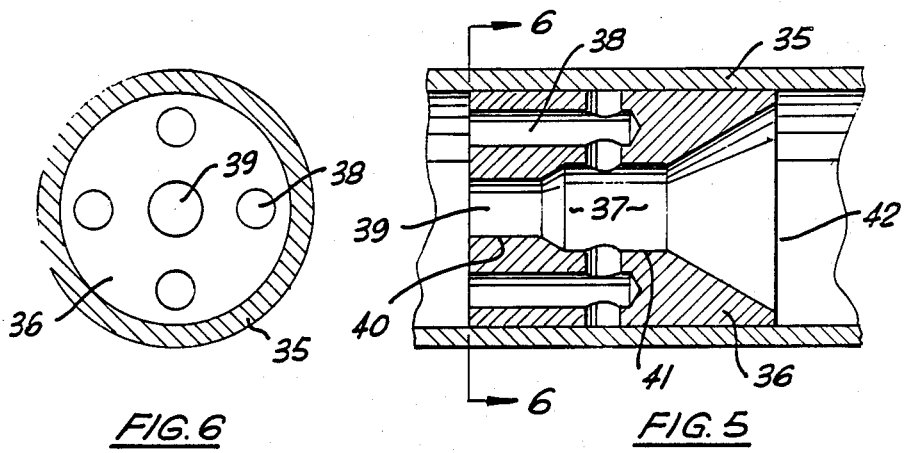
FIG. 6
FIG. 5
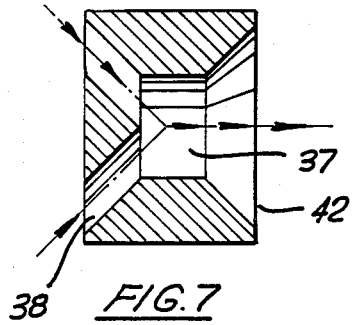
FIG. 7

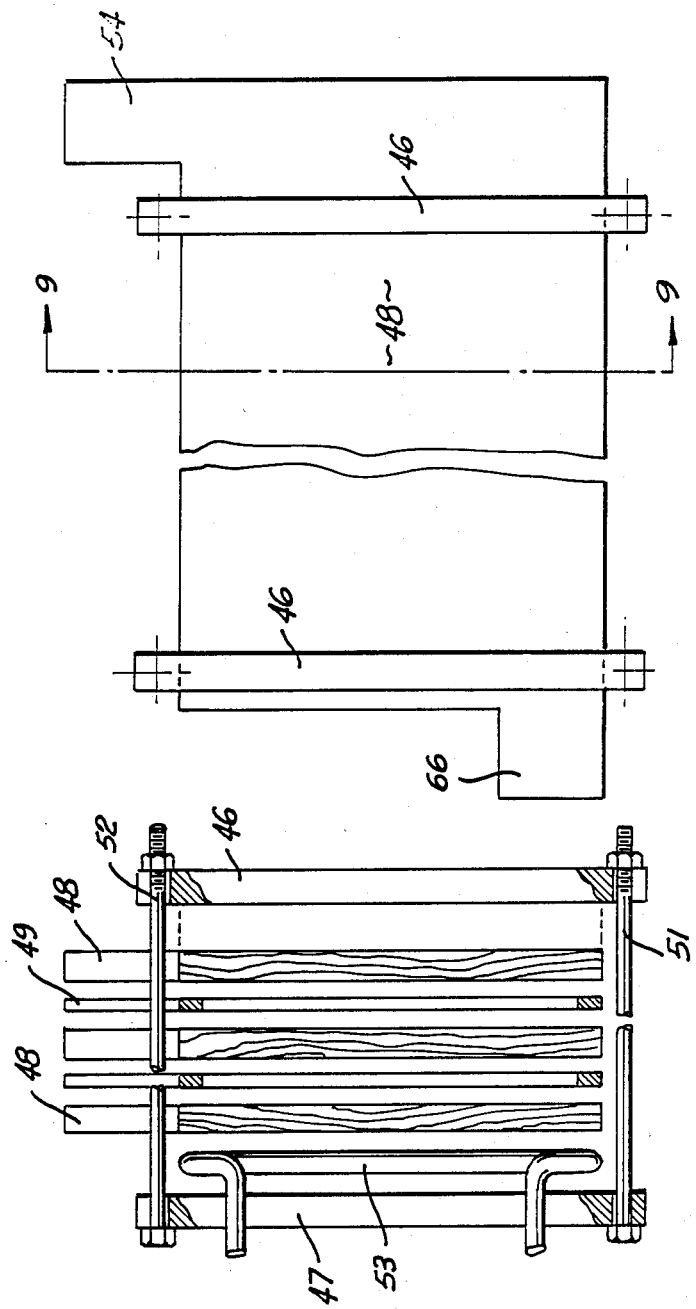

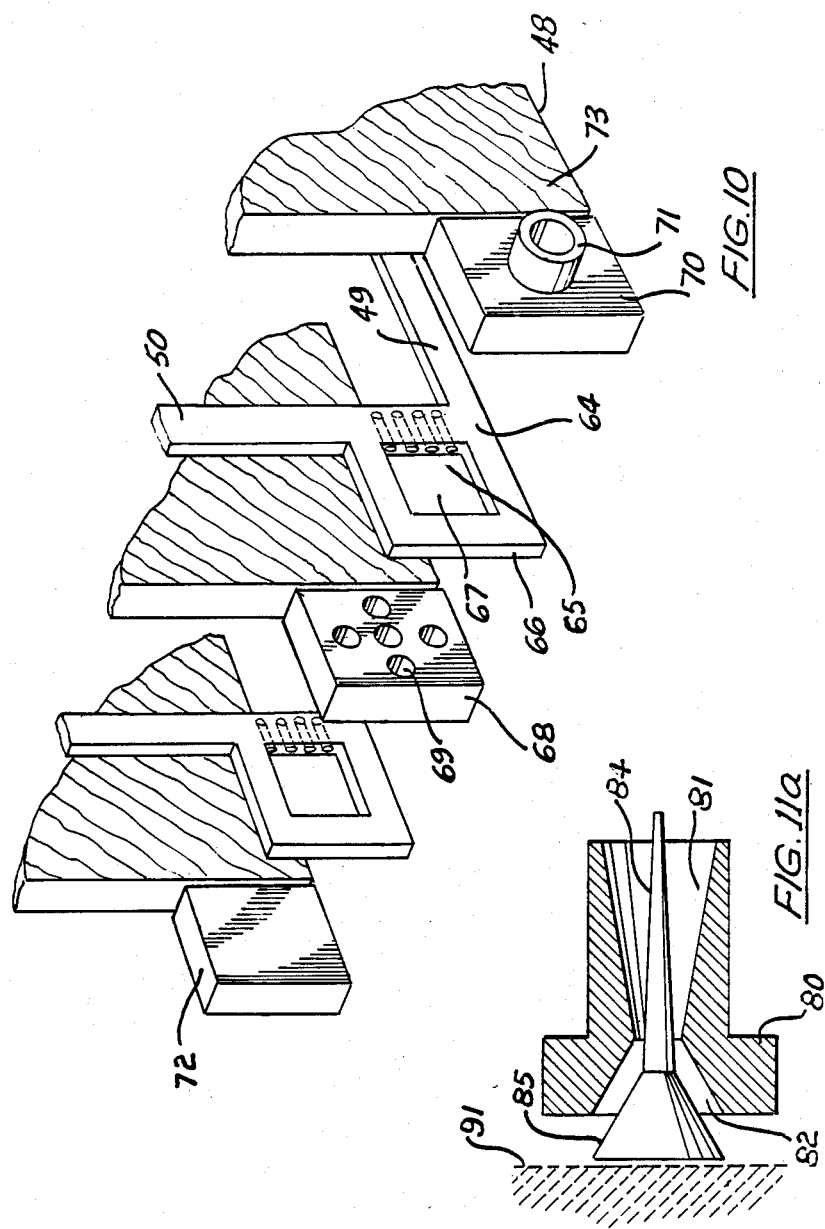

MOULDED RESIN ARTICLE

This is a continuation of application Ser. No. 937,556 filed Dec. 3, 1986 and now abandoned.

FIELD OF THE INVENTION

This invention relates to the production of moulded plastics articles, particularly slabs or sheets and rods of heavily filled, thermo-setting synthetic resinous material having the appearance of marble or other fine grained stone.

Typically articles of the kind in question are used as bench or table tops, as bathroom wash basin or vanity unit draining boards and the like.

BACKGROUND OF THE INVENTION

Hitherto, small thermo-setting resin articles have been injection moulded from resin based compositions utilizing heated dies and this has proved satisfactory; but when extensive sheets are required the mould costs associated with conventional injection moulding techniques become prohibitive. This is primarily due to the high temperatures and pressures involved (at least several hundreds of degrees centigrade and several thousands of pounds per square inch) and the need to maintain dimensional accuracy in the thickness of the finished sheet throughout its entire longitudinal and transverse extent. When long rods are required a similar difficulty arises. Indeed the problems of such that injection moulding is avoided and such articles are either not used or are fabricated by other techniques.

One widely adopted expedient for the production of sheets is to utilise a chemically reactive two part resin base and to float a layer of the uncured composition onto a moving conveyor for its support until it sets. The conveyor is usually vibrated to settle the layer and hasten the migration of air bubbles in the composition to the upper surface. Two major disabilities arise. Firstly, the long setting time requires either a long, and therefore expensive, conveyor or a very slowly moving conveyor with a consequent low production rate and secondly a finish machining operation is required to obtain dimensional accuracy and to eliminate air bubbles in the surface layer of the sheet. The latter is particularly objectionable because it is inherently wasteful of a very expensive raw material.

SUMMARY OF THE INVENTION

With the foregoing in mind the invention was devised to provide for the moulding of sheets and rods of reaction-setting compositions utilising relatively cheap and lightly constructed moulding equipment and with very little waste.

The invention achieves that object by de-aerating the main or predominating ingredient of a composition, mixing that main ingredient with the minor ingredient, flowing the mixture under air-less conditions into the bottom of a vented but essentially closed mould cavity defined by a mould assembly, allowing the composition to set in the mould cavity, and then stripping the mould assembly from the finished article.

Preferably the rate of flow of the mixture into the mould cavity is low enough to allow pressure to equalize within the cavity and avoid any substantial increase in pressure therein. The pressure within the mould cavity is preferably maintained around atmospheric pressure but preferably not exceeding, any 10 lb/sq. in. gauge. For preference, the flowing is done intermittently by means of pump which dwells for a predetermined period at the end of each stroke thereof to allow for such pressure equalisation within the mould cavity. To allow for low flow rates into the mould cavity the mixture preferably consists of ingredients which cause the setting time of the composition to be longer than 5 minutes and preferably 10-15 minutes. The setting time may be as long as several hours with large moulds. This low setting time may be achieved by use of required amounts of setting agents or by use of a composition which only sets following application of heat to the mould cavity.

It is also preferably to allow the pressure within the mould cavity to equalize to atmospheric pressure before setting is completed.

The use of low pressures within the mould cavities allows inexpensive, relatively flimsy mould structures to be used.

For preference, said minor ingredient may be a retarder, accelerator, catalyst, or mixture thereof.

BRIEF DESCRIPTION OF THE DRAWINGS

An embodiment of the invention will now be described by way of example only, with reference to the accompanying drawings in which:

FIG. 4 is a partly sectioned side elevation of the piston in FIG. 2;

FIG. 5 is a partly sectioned side elevation of one of the mixer plugs used in the mixing device shown in FIG. 1;

FIG. 6 is a section of the mixer plug of FIG. 5 taken on line 6—6;

FIG. 7 is a section of an alternative form of mixer plug for use with the invention;

FIG. 8 is a side elevation of a multi-cavity sheet assembly;

FIG. 9 is an end elevation of the mould cavities shown in FIG. 8;

FIG. 10 is an exploded perspective view of the inlet port blocks of the assembly of FIG. 8;

FIG. 11a is a section of the inlet plug and valve shown in FIG. 10.

FIG. 11b is a section of an alternative embodiment of the inlet plug valve shown in FIG. 11a.

DETAILED DESCRIPTION OF THE INVENTION

Figure 1:
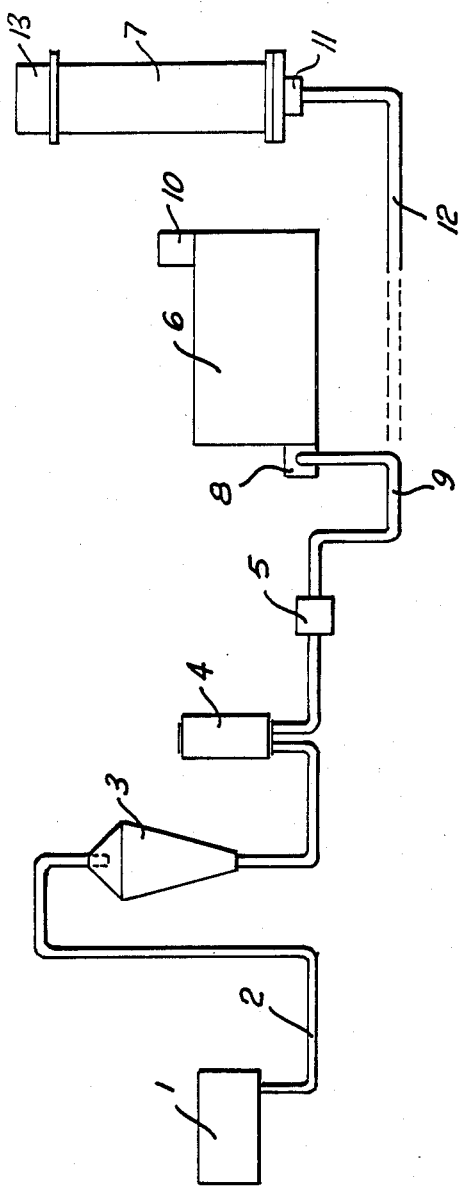
FIG. 1 is a block diagram of the components of the system used to perform the process according to the invention.
Figure 2:
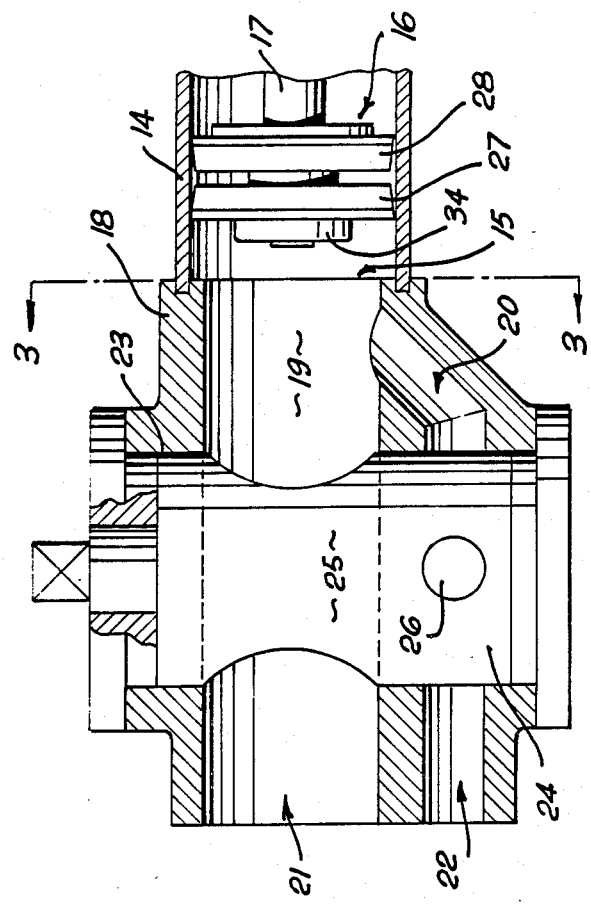
FIG. 2 is a sectional side elevation through the head end-portion of the pump shown in FIG. 1.
Figure 3:
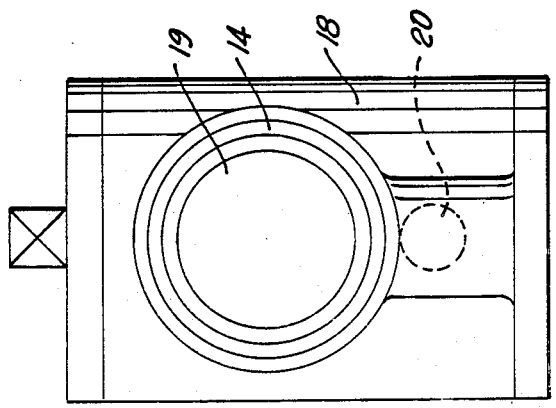
FIG. 3 is a section taken on line 3—3 in FIG. 2.

Measured quantities of the basic resin, preferably a polyester resin, and finely ground filler are mixed together in a conventional mixing mill 1. If a plain milky-white product is required the filler may consist solely of aluminum hydroxide or trihydrate ground to a particle size of from 4 to 30 microns. Alternatively, if coloured or other effects are required pigments, metal powders or other coloured fillers may be used.

The resin and filler mixture is then partly pumped and partly drawn through pipe 2 into the top of an evacuated hopper 3 in which a partial vacuum is maintained by a constantly running vacuum pump (not shown). The incoming material is immediately fragmented or splattered by the expansion and outflow of entrained air and falls as air-less particles to the bottom of the hopper. There it collects until taken away by a proportionating pump 4 and static mixer 5 which injects a minor but accurately metered quantity of hardener catalyst into the mixture. The pumping rates are chosen so as to ensure that the system thereafter is kept full of the mixture, and thus free of air, until the mixture is delivered into the cavities of moulds 6 and 7.

Moulds 6 and 7 in this example are shown as a mould for forming sheet material 6 and a mould for formings circular rods 7. The sheet mould 6 has an inlet valve and distributor plate 8 at the lower end of one side adapted to receive said mixture from pipe 9. At the upper end of an opposing side of said mould a riser means 10 is provided to vent the mould. Rod mould 7 is provided with a inlet valve 11 at its lower end adapted to receive said mixture from pipe 12. A vacuum tank 13 is provided at the upper end of said mould.

A novel pump for the above purpose is a feature of the invention. The pump is preferably:

(a) purely mechanical in operation, (b) able to meter and deliver a charge with micrometrical accuracy, (c) particularly amenable to control by use of a micro-processor or other computer, (d) not subject to fractional suck-back of a delivered charge, and (e) both simple to make and to operate.

In summary, the pump of the invention comprises:

a metering cylinder having an open head-end, a piston in said cylinder screw-operable for advancement towards and retraction from said head-end, a cylinder head on said head-end, an intake port and a discharge port both opening to said head-end and both extending through said head, a circularly-sectioned valve chamber extending through said head and intersecting both said ports, a plug valve rotatably housed in said chamber and having two angularly phased-apart passages through it respectively able to register with said ports, and means for actuation of said piston and rotation of said plug-valve under such co-ordinated or independent control that when said piston is retracting from said head-end the intake port is open and the discharge port is closed, and when said piston is advancing towards said head-end the intake port is closed and the discharge port is open.

A cylinder 14 has an open-end 15 and houses a piston 16 mounted on a lead-screw 17 furnished with a nut. This screw arrangement is preferably of the recirculating ball type, and the nut is axially restrained and turned, to axially move the screw, by sprocket drive or otherwise. A cylinder-head 18 is applied by conventional bolting and flanging or otherwise to the open end 15, and has an intake port 19 and a discharge port 20 both opening to the head-end of cylinder 14.

The other end 21 of port 19 is adapted for connection to the outlet of the vacuum chamber, and the other end 22 of port 20 is adapted for connection to a mould to be described hereinafter.

The cross-sectional area of port 19 is preferably several times greater than that of port 20, as pressure available for induced intake of composition is limited.

Cylinder-head 18 has a circularly-sectioned valve chamber 23 placed in it to intersect both ports 19 and 20. This chamber houses a plug valve 24 having two angularly phased-apart passages, 25 and 26, through it respectively able to register with ports 19 and 20.

In the illustrated arrangement the passages 25 and 26 are phased 90° apart hence the past rotations of the plug valve are quarter revolution oscillations. These may be performed by use of a common rotary actuator. Preferably each "change-over" oscillation is performed abruptly so that it takes place wholly within the end-of-stroke reversals of piston 16. For preference, the piston of the pump is arranged to dwell at the end of each stroke to allow for pressure equalisation within the mould cavity.

The working stroke of piston 16 may be accurately controlled micrometrically in terms of revolutions, and fractions thereof, of the drive nut for piston rod 17, by use of a motor or other drive advice whereby co-ordinated control of both plug-valve oscillation and nut actuation is effected.

In the present invention two such pumps may be used to contribute the different ingredients required (resin and catalyst) in precisely metered proportions.

A feature of the pump resides in the pump piston 16 which has been developed to provide a long working life notwithstanding the abrasive nature of the material being pumped.

Each piston 16 comprises a pair of truncated conical cup-like bodies 27 and 28 disposed back-to-back and joined integrally together by an annular spacer portion 29 therebetween. A clearance hole 30 for the piston rod 17 pieces the floor 31 of each body and the spacer portion. The oppositely directed rims 32 and 33 of each cup-like body taper to a substantially knife edge and each rim margin diverges radially outwardly to a slight degree. The arrangement is such that as the rims wear, the nut 34 holding the piston 16 to the piston rod 17 may be tightened to bear against the radially outer margins of the floors of the cup-like bodies to cause them to bow about the spacer to some extent and cause some radially outward flexure of the rims to thereby compensate for the wear thereof. For preference the piston 16 is a one piece moulding of high density polyethylene or polypropylene.

The material, now including the catalyst, is passed through a stationary mixing device at the outlet of the pump and then the mixture is passed to the mould.

Conventional stationary mixing devices usually comprise a plurality of angularly and longitudinally spaced, obliquely disposed vanes in a pipe which cause the flowing material to divide and recombine or a plurality of plugs in the pipe each pierced by a plurality of obliquely disposed bores which produces a similar effect. Such conventional devices may be utilised in apparatus according to the invention but for preference a novel and more efficient mixer is used to replace some or all of the mixing elements of such a known device.

That novel mixer comprises a plurality of elements each comprising a pipe section 35 with a plug 36 therein. The plug is pierced by a major central passage 37 and by a plurality of minor passages 38 parallel to and spaced around the major passage.

The major passage comprises an entrance port 39, a portion 40 of constant cross-section extending from the entrance port 39 leading to a further portion 41 of somewhat larger cross-section terminating in a divergent outlet 42.

Each minor passage 38 comprises an entrance port 43, a blind ended portion 44 extending from the entrance port 43 and a radially inwardly extending transfer portion 45 communicating with the larger cross-sectioned portion 41 of the major passage upstream of its divergent outlet.

Individually the minor passage inlet ports 43 are smaller than the major passage inlet port 39, but collectively they present a lesser obstacle to material flow. Thus flow is established through all passages simultaneously and the respective streams impinge on each other in the larger cross-sectioned portion of the major passage before emerging from the latter's outlet as a mixed stream.

The resultant mixing effect is excellent and thorough mixing is obtained with a relatively smaller number of elements in series by comparison with conventional elements. More importantly, mixing is achieved in a shorter pipe length overall and with a lesser pressure drop across the mixer.

An alternative form of mixer is shown in FIG. 7. The plug in this case has four outlet passages 38 equally spaced around the inlet side of said plug and extending inwardly at an angle to the axis of said plug to major passage portion 37 of constant cross section which again terminates in a divergent outlet portion 42.

The mould assembly 6 for making sheets may be a demountable structure defining a plurality of mould cavities. It preferably comprises two fabricated steel platens 46 and 47 and an array of alternating cavity side panels 48 and cavity boundary frames 49 disposed side by side on edge and compressed between the platens; there being one more side panel than there are boundary frames so that there is a panel at each side of the array.

Each side panel 48 may be a plain rectangular sheet of solid core timber panel, plywood or the like with surface coatings of a smooth, hard plastics material. Panels marketed under the trademark laminex and intended for industrial use are ideal.

Each boundary frame 49 may be a generally rectangular frame fabricated from extruded aluminum section 50 having a side equal to the width of the desired sheet.

The boundary frames and side panels may be assembled side by side in register and draw bolts 51 extended through clearance holes 52 in the platens 46 and 47 adjacent the assembly whereby the platens are drawn together to clamp the boundary frames 49 and side panels 48. Preferably, the final clamping pressure is not provided by those bolts but rather by the inflation of a pneumatic gasket 53 made from resilient air hose interposed between one platen and a secondary mating platen. That gasket 53 is fabricated to match the boundary frames and is positioned in substantial register with the boundary frames. Thus its inflation produces an exactly uniform clamping force at all points on those frames and ensures there is no distortion of the panels and frames from the planar condition.

The platens and the array of panels and frames are supported as a unit by a, preferably mobile, frame-work, with one end of the said unit slightly higher than the other. Indeed if desired the frame-work may be such that the angle of tilt is adjustable.

The uppermost end of the top side member of each boundary frame has an upwardly extending, relatively small rectangular riser projection 54 formed in it of which one upright side member 55 is an extension of the adjacent upright end member 56 of the boundary frame as a whole. A plurality of small outlet ports 57 are formed in the top side member of the boundary frame and provides for flow of material from within the cavity 58 defined by the boundary frame into the cavity 59 defined by the riser projection. The said side member 55 of the riser projection is pierced by at least one, but preferably two, vent holes 60 and 61 disposed one above the other. Thus the issuance of material from a vent hole indicates that the corresponding mould cavity has been completely filled to the level of the vent hole in question.

In practicing the invention, it is preferred that the respective mould cavities be filled as described hereinafter until material issues from the lower vent hole 60 of each riser 54. As material reaches each lower vent, both vents of the corresponding riser structure are plugged by plugs 62 and 63 to prevent further flow into the corresponding cavity. Once all cavities are so filled all of the upper vents are unplugged to allow the material to flow between cavities and equalize the head pressures therein.

The bottom end of the lowermost end member of each boundary frame has an inlet port block 64 set into it, which port block 64 is pierced by a plurality of small inlet ports 65 each of which may provide for the flow of material from outside the boundary frame into the mould cavity 58 defined by it.

The said bottom end of the lowermost end member has a rectangular runner projection 66 formed on it similar to the riser projection but extending more or less horizontally (except in that it shares the inclined position of the entire mould unit) instead of more or less vertically. Thus, each runner projection 66 defines a runner cavity 67 in communication with the said inlet ports 65.

Runner blocks 68 of the same thickness as the side panels are clamped between the respective runner projections as, in effect, extensions of the side panels. Those runner blocks, except for one end block 72, are each pierced by a considerable plurality of small diameter flow openings 69. The other end block is covered by a plenum cover 70 having a pipe connector 71 extending from it whereby material from the pump may be piped into the plenum cover for flow through the runner block flow openings 69 from one runner cavity to the next and from those cavities through the respective inlet ports 65 into the mould cavities themselves.

When the mould cavities are being so filled selected inlet ports are plugged so that the number of operable inlet ports increases from mould cavity to mould cavity along the length of the runner flow path. This enables substantially equal filling rates to be achieved for all the mould cavities notwithstanding the high viscosity of the inflowing material and consequent pressure drop along that path.

Furthermore, the in-flow is intermittent to provide for equalising flow between the cavities to occur during pauses in the in-flow.

Once the mould cavities have been filled and the material therein has set the entire mould structure may be dismantled to strip it from the finished sheets. Because of the small diameter of the individual flow openings and inlet ports the runner and riser parts may be readily broken away from the finished sheet and the set plugs of material in those openings and ports may be tapped or otherwise expelled therefrom. Such expulsion is facilitated if the individual openings are tapered from end to end.

The mould structure 7 for moulding rods may comprise an outer tubular jacket 74 closed at each end and a plurality of spaced apart smaller tubes 75 extending longitudinally through the jacket. These tubes are preferably generally circular. The jacket is mounted for rotation about a transverse axis 76 at about its midlength to allow the jacket to be tilted to an upright position for injection of material at its bottom end.

The lower end is covered by a dished cover 77 to constitute a plenum chamber 78 and is pipe connected to the pump. The pipe connection incorporates a manually operable plug type inlet valve 79.

The upper end of the mould structure is covered to form a tank 13, in this case the connection 86 is to a vacuum pump. Also the upper cover 87 is preferably transparent to enable an operator to see when the individual tubes have been filled with material.

Before the rods have set, hot water may be flowed via pipe connections 89 and 90 respectively, through the jacket space 88 which, it has been found, enhances the subsequent contraction of the molded material to enable the finished rods to be extracted therefrom.

Figure 11B:
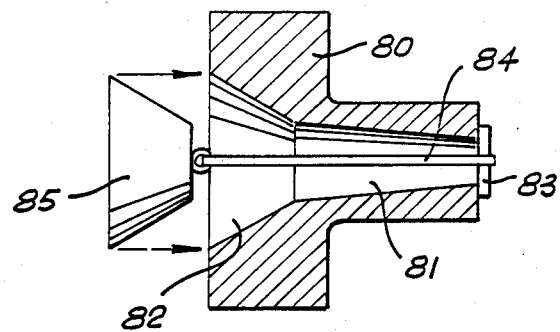
Figure 12:
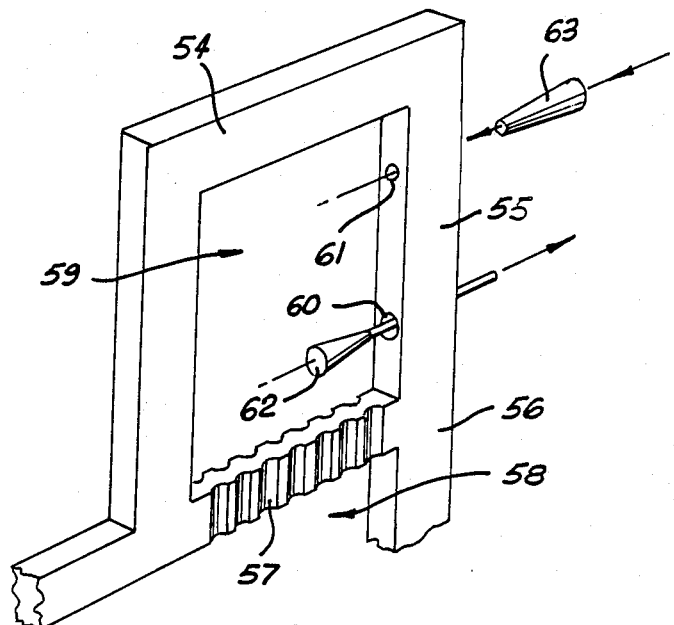
FIG. 12 is an enlarged perspective view of the riser arrangement of the assembly of FIG. 8.
Figure 13:
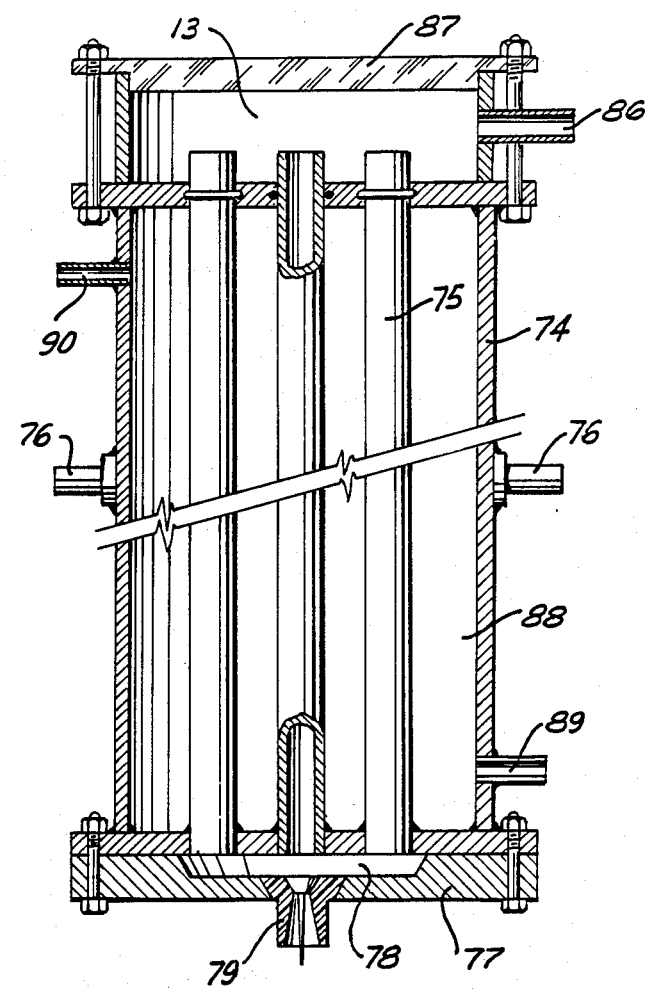
FIG. 13 is a partly sectioned side elevation of a rod mould.

Embodiments of such a plug type inlet valve 79 are shown in FIGS. 11a and 11b. Such valves are preferably used on all inlets to the mould structures to prevent back-flow of injected material. It consists of a valve housing 80 having a passage therein comprising a tapered valve seat portion 82 adapted to sealingly engage with plug valve 85, and a further tapered inlet portion 81. In the valve shown in FIG. 11a each portion is oppositely tapered, said tapers diverging towards the valve extremities, and the taper of said valve seat portion 82 being greater than that of the inlet portion 81. The valve is operated by an operating stem 84 attached to the base of the plug 85. This stem is also tapered towards the base of plug 85. The valve and stem are tapered to allow removal of any material which may set within the valve passage. The wall of the mould inlet structure 91 prevents the plug 85 from leaving the valve passage.

In the valve shown in FIG. 11b, both the inlet and valve seat portions are tapered inwardly towards the valve inlet. In this case, the valve stem 84 is preferably disposable and is thrown away with any material which may set in the valve. Said stem member is preferably made of a flexible resilient material such as rubber, and is tensioned by a retaining member 83 so that the valve is biased towards a closed position.

It will be apparent to those skilled in the art that further embodiments and exemplifications are possible without departing from the spirit or scope of the invention described.

I claim:

1. Apparatus for moulding of articles from a reaction setting composition comprising:
    means for de-aerating a main or predominating ingredient of said composition, said main ingredient comprising an abrasive filled material,
    means for mixing said main ingredient with a minor ingredient to form a mixture,
    means for intermittently flowing said mixture under air-less condition into the bottom of a vented but essentially closed mould cavity defined by a mould assembly, said means for flowing said mixture including a pump comprising:
    a metering cylinder having an open head-end,
    a piston in said cylinder, screw operable for advancement towards and retraction from said head-end,
    a cylinder head on said head-end,
    an intake port and a discharge port both opening to said head-end and both extending through said head,
    a circularly sectioned valve chamber extending through said head and intersecting both said ports,
    a plug valve rotatably housed in said chamber and having two angularly phased-apart passages through it respectively able to register with said ports,
    means for actuation of said piston and rotation of said plug-valve under control such that when said piston is retracting from said head-end the intake port is open and the discharge port is closed, and when said piston is advancing towards said head-end the intake port is closed and the discharge port is open, said means for flowing providing intermittent flowing of said mixture for a predetermined time to allow for pressure equalization within said mould cavity, and
    said mould assembly being adapted to be stripped away from the finished article once setting of said composition has finished.

2. Apparatus according to claim 1 wherein said means for de-aerating includes an evacuated hopper having a partial vacuum maintained therein and adapted to receive said main ingredient at a top portion thereof and having collection means at the bottom thereof adapted to output said ingredient in a de-aerated form.

3. Apparatus according to claim 1 wherein said means for actuation causes said piston to dwell at each end of its stroke.

4. Apparatus according to claim 1 wherein said means for actuation comprises a recirculating ball type screw arrangement having an axially restrained nut which is rotated to axially move a screw coupled to said piston.

5. Apparatus according to claim 1 wherein said piston comprises a pair of truncated conical cup-like bodies disposed back-to-back and joined integrally together by an annual spacer portion therebetween.

6. Apparatus according to claim 5 wherein the floor of each cup-like body and said spacer portion are pierced by a clearance hole adapted to receive a piston rod, said cup-like bodies having rims tapered to a substantially knife edge and each rim margin diverging radially outwardly to a slight degree.

7. Apparatus according to claim 6 wherein said piston is a one piece moulding of high density polyethylene.

8. Apparatus according to claim 1 wherein said means for mixing includes a plurality of elements each comprising a pipe section with a plug therein, said plug being pierced by a major central passage and by a plurality of minor passages generally parallel to and spaced around said major passage, each minor passage having a transfer portion communicating with said major passage.

9. Apparatus according to claim 8 wherein said major passage comprises, an entrance port, a portion of constant cross-section extending from said entrance port to a further portion of substantially larger cross-section terminating in a divergent outlet, and
    each minor passage comprises an inlet port, a blinded end portion extending from the entrance port, said transfer portion extending radially inwardly and communicating with said larger cross-sectioned portion of said major passage upstream of its divergent outlet.

10. Apparatus according to claim 9 wherein each said minor passage inlet port is smaller in cross-section than said major passage entrance port but the collective cross-sectional area of said minor passage inlet ports is greater than that of said major passage entrance port.

11. Apparatus according to claim 11 wherein said means for mixing includes a plurality of elements each comprising a pipe section with a plug therein, said plug having a plurality of spaced inlet passages extending inwardly to a generally central major passage portion of constant cross-section extending axially of said plug and terminating in a divergent outlet portion, said inlet passage having entrance ports positioned radially outwardly of said major passage portion.

12. Apparatus according to claim 11 wherein said inlet passages extend at an angle to the axis of said plug, said entrance ports positioned on one side of said plug and said divergent outlet portion positioned on the other side thereof.

13. Apparatus according to claim 1 wherein said mould assembly defines a plurality of mould cavities, each formed by a pair of side panels disposed on each side of a cavity boundary frame, and a pair of plates adapted to engage and clamp said side panels so as to form a substantially rigid structure.

14. Apparatus according to claim 1 wherein said mould assembly defines a plurality of mould cavities formed by an array of alternating cavity side panels and cavity boundary frames disposed side by side and clamped between at least two platens, there being one more side panel than boundary frames so the array has a panel at each side thereof.

15. Apparatus according to claim 13 wherein said mould assembly includes venting means provided at an upper portion of each said boundary frame and adapted to provide an indication that a said mould cavity has been completely filled with said composition.

16. Apparatus according to claim 15 wherein said venting means comprises a riser projection having a cavity therein, located on said upper portion of each said boundary frame, each said riser projection cavity communicating with a corresponding said mould cavity by means of a plurality of outlet ports piercing the top side of said each boundary frame. At least one vent hole being located in each said riser projection, the issuance of composition therefrom indicating the complete filling of the corresponding said mould cavity.

17. Apparatus according to claim 13 wherein each of said boundary frames is provided with an inlet port block adapted to receive and flow said composition into a said mould cavity, said block having a plurality of inlet ports therein providing for flow of said composition from outside the boundary frame into said mould cavity.

18. Apparatus according to claim 17 wherein each said boundary frame has a runner projection located adjacent and outward of said inlet ports, said runner projection defining a runner cavity in communication with said inlet ports.

19. Apparatus according to claim 18 including a plurality of runner blocks adapted to be clamped between respective runner projections, each runner block having a plurality of flow openings therethrough, and at least one runner block having a plenum cover adapted to receive said composition from said flowing means such that said composition may flow through the runner block flow openings from one runner cavity to the next and from those cavities through said respective inlet ports into said mould cavities.

20. Apparatus according to claim 19 wherein said inlet ports are tapered.

21. Apparatus according to claim 16 wherein said outlet ports are tapered.

22. Apparatus according to claim 1 wherein said mould assembly comprise a plurality of spaced apart tubes mounted and extending longitudinally through an outer jacket surrounding said tubes, said tubes opening at one end to a plenum chamber adapted to receive said composition and opening at their other end to vacuum chamber adapted to have a vacuum applied thereto.

23. Apparatus according to claim 22 wherein said jacket is mounted for rotation about a transverse axis at about its mid-length to allow the jacket to be tilted to an upright position for injection of said composition into said plenum chamber.

24. Apparatus according to claim 22 wherein said vacuum chamber is provided with a transparent cover to enable an operator to see when said tubes have been filled with said composition.

25. Apparatus according to claim 22 wherein said outer jacket provides an enclosed jacket space between itself and said tubes, said outer jacket having means provided therein to allow hot water to be flowed through said jacket space.

26. Apparatus according to claim 1 wherein said means for flowing includes inlet valve means provided at the bottom of said mould cavity, comprising a tapered valve member adapted to sealingly engage with a complementary inwardly tapered valve seat, said valve member being pulled into engagement with the valve seat by means of a stem member extending from said valve member through said valve means to an inlet portion of said valve means.

27. Apparatus according to claim 26 wherein said valve seat and said inlet portion are oppositely tapered, said stem member being inwardly tapered with respect to said valve means, and adapted to allow said valve member to be manually pulled into engagement with the valve seat.

28. Apparatus according to claim 26 wherein said stem member is formed of a resilient material which is tensioned so as to bias said valve member towards a closed position.

* * * * *